INVENTOR.
ROY F. DEHN
BY
Watts, Hoffmann, Fisher & Heinke
ATTORNEYS.

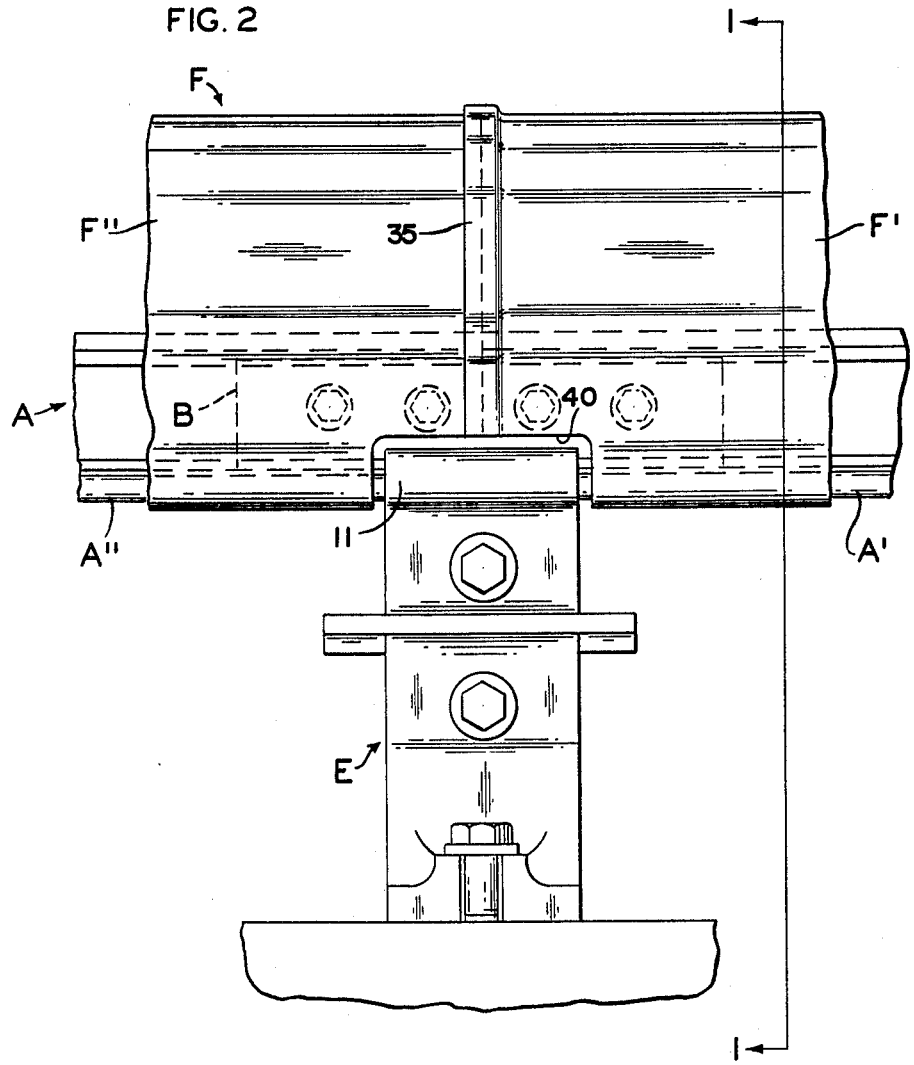

United States Patent Office 3,475,568
Patented Oct. 28, 1969

3,475,568
TROLLEY CONDUCTOR GUARD
Roy F. Dehn, Wickliffe, Ohio, assignor to McNeil Corporation, Wickliffe, Ohio, a corporation of Ohio
Filed May 15, 1967, Ser. No. 638,352
Int. Cl. B60m 1/04, 1/24
U.S. Cl. 191—35                          3 Claims

ABSTRACT OF THE DISCLOSURE

An electric power distributing system for railways and the like comprising: an electric current conductor rail having flanges extending laterally along the lower edge at opposite sides and slidably supported upon upwardly facing surfaces of insulators having hold-down flanges extending around and overlying the edge portions of flanges for limiting movement of said rail relative to the support surfaces of the insulators, guards slidably connected to and supported by the flanges of the rail and projecting beyond and overlying the top of the rail, the guard means having an abutment surface spaced a short distance from and below the top of the rail, and a current collector supported at the side of the conductor rail opposite the guard engageable with and movable along the top of said rail with the end thereof extending beyond the rail towards the guard and overlying the abutment surface on the guard.

---

Figure 1:
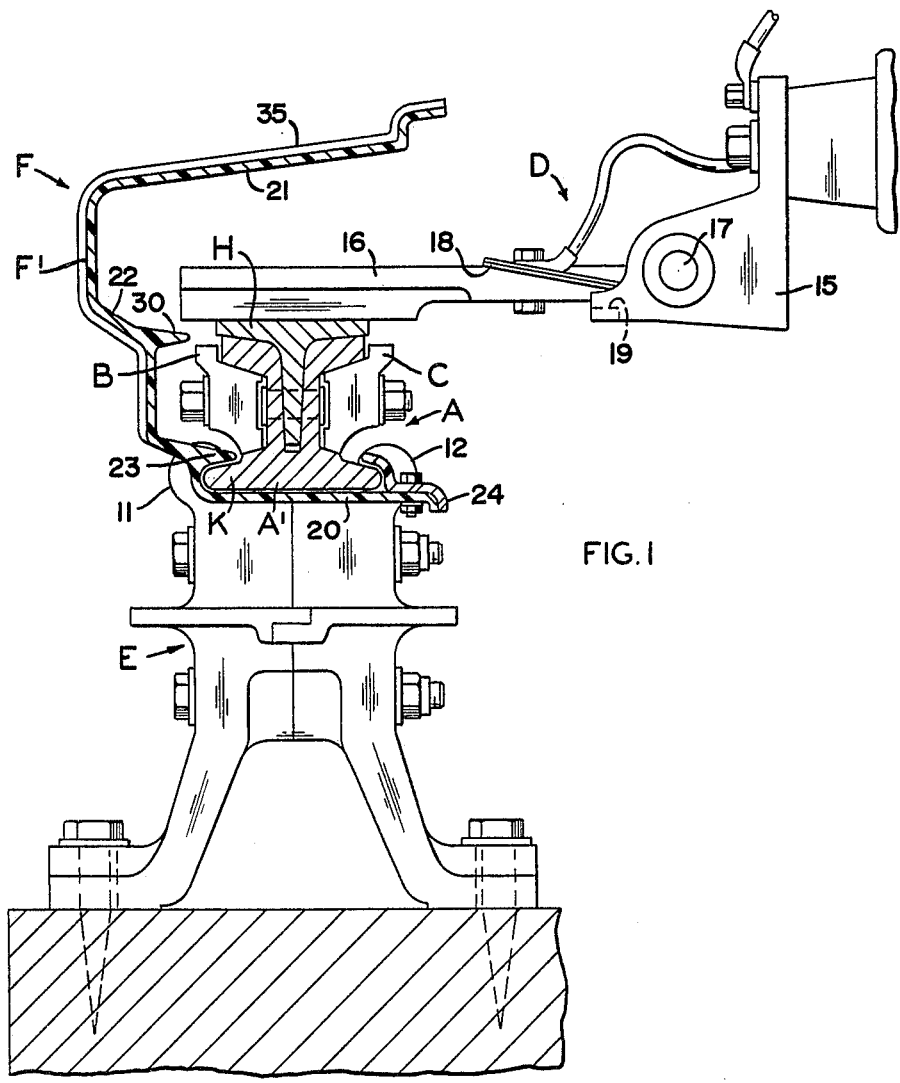

The invention concerns trolley conductors of the bar or rail type, sometimes referred to as the "third rail" and more particularly, a guard therefor supported largely, if not entirely, from the conductor bar.

DESCRIPTION OF INVENTION

The invention provides a novel and improved bar or rail-type trolley conductor adapted to be traversed by a current collector on a moving trolley or vehicle and having a shield or guard thereabout to protect the conductor from accidental contact by foreign bodies, etc.

The invention resides in certain constructions and arrangements of parts and further advantages of the invention will be apparent from the following description of the preferred embodiment described with reference to the accompanying drawings forming a part of this specification in which similar reference characters designate corresponding parts, and in which FIG. 1 is a sectional view of a bar or rail-type trolley conductor installation taken approximately on the line 1—1 of FIG. 2; and FIG. 2 is a fragmentary side elevation of FIG. 1 looking from the left.

Referring to the drawings and the preferred embodiment of the invention shown therein, the reference character A designates generally an electrified rail comprising a number of conductor bars or rail sections A', A'', connected end to end by means including pairs of splice plates B and C and installed alongside a railway, not shown, to supply current to electrically powered vehicles on the railway through collector shoe assemblies D connected to the vehicles. The rail A is supported at suitable intervals therealong by support structures E, only one of which is shown in the drawings and is shielded by a protective guard F composed of guard sections F' and F'' and which extend in end to end relation along the rail A.

Each of the conductor bars or rail sections is a composite structure formed of a first elongated rail member H of high strength and good wearing qualities, for example, steel, having a cross-sectional shape generally similar to that of a T-beam and a second elongated rail member K of relatively high electrical conductivity, for example, aluminum, having a cross-sectional shape generally similar to that of an I-beam and a medial longitudinal extending slot in one flange side thereof into which the web or stem of the member H is engaged with the underside of the flange portions of the T-shaped member engaging the adjoining sides of the flange portions of the I-shaped member K.

The two members H and K are preferably made to relatively close tolerances, are tightly pressed together with the adjoining surfaces in intimate contact and are fixedly connected together at intervals, of approximately two feet or less, as by rivets preferably made of material similar to that of which the member K is formed. Other types of mechanical fasteners, for example, bolts could be employed in place of rivets. The construction is such that the difference in expansion of the members during use are largely compensated for or counterbalanced and the conductor bars or rail sections remain substantially flat under normal temperature conditions.

The member H, which is made of relatively high strength material having a good wearing quality serves as the part of the conductor bar or rail engaged by the current collector D and the member K made of relatively soft material having high electrical conductivity serves as the primary current carrying part between the feeder connections to the rail A. The composite conductor bars or rail sections incorporate optimum strength and wearing characteristics with optimum current carrying capacity, is of minimum size, requires support at only widely spaced intervals and requires minimum feeder connections. The member H may be a commercially available standard structural steel beam, the member K is preferably an aluminum extrusion.

The adjoining ends of any two of the individual conductor bars or rail sections forming the electrified or third rail A are mechanically and electrically connected by a pair of splice bars or plates B and C at opposite sides of and overlapping the abutting ends of the adjoining rail sections. The splice bars B and C are bolted to the rail sections by bolts which extend through openings in the splice bars and the vertical webs of the conductor bar sections and on which bolts securing nuts are threaded.

Each of the support structures E for the rail A comprise a two member insulator assembly, the respective members of which are duplicates of one another, and are preferably fabricated of Fiberglas or a suitable molded resin, such as epoxy, reinforced with Fiberglas or other suitable material.

The bottom flanges of the conductor bar sections rest on substantially flat load-bearing or supporting surfaces of the member insulator assemblies E. Each of the assemblies E have a pair of hold-down or retaining flanges 11 and 12 integral therewith and extending along opposite sides of the load supporting surface and parallel to the rail. The flanges 11 and 12 curve upwardly and inwardly over the edge portions of opposite sides of the bottom flanges of the rail. The load surface of each of the assemblies E and the hold-down flanges 11 and 12 thereof form spaced confronting abutments between which the edge portions of the bottom flange of the rail are supportingly received. The hold-down flanges 11 and 12 conform to but are slightly spaced from the rail and prevent appreciable lateral or upward movements of the rail relative to the insulator support units or assemblies E, but at the same time permit longitudinal shifting of the rail relative to the support assemblies to accommodate elongation and contraction of the rail which may occur by reason of temperature changes. The top sides of the bottom flange portions of the rail are relieved slightly to better accommodate the hold-down flanges 11 and 12 of the support assemblies E. The splice bars B and C are also undercut or relieved to better accommodate or receive the hold-down flanges 11 and 12 where the support assemblies are located at the connection of two conductor bar or rail sections.

The current collector shoe assembly D comprises a bracket 15 connected to the movable carrier, that is, the railway car or other vehicle, and a rail engaging member or shoe 16 pivoted by the pivot pin 17 to the bracket 15. The member 16 is biased in a counterclockwise direction, as viewed in FIG. 1, that is, in a direction to engage the rail A by gravity and by a spring 18. In the embodiment shown the left-hand end of the member 16 projects or extends slightly to the left of the rail.

Bracket 15 to which the member 16 of the current collector is pivoted includes a stop 19 for limiting the rotation of the member 16 in a counterclockwise direction, as viewed in FIG. 1, when the current collector is moved along a section of track where there is no conductor rail, as when the carrier to which the current collector is connected, is passing through a switch.

The rail guard or cover sections F', F", etc., which make up the rail cover or guard F are duplicates of one another except for the cut away portions provided to accommodate the rail support assemblies E.

Each of the guard sections is more or less channel-shaped having bottom and top flange parts 20 and 21, respectively, connected by a web part 22 of irregular shape in cross section. The bottom flange part 20 is flat and engages the lower or underside of the rail. The web part 22 has a flange 23 overlying the edge of the lower left-hand flange portion of the rail, as viewed in FIG. 1, that is, the lower flange portion of the rail opposite the side along which the carrier travels. This flange in combination with detachable clip-like members 24 bolted to the right-hand side of the bottom web 20, as viewed in FIG. 1, and which members have portions thereof overlying the opposite lower flange of the rail, detachably secures the respective guard sections to the rail.

The web part 22 of each of the guard sections has a second flange 30 projecting toward the rail, the upper surface of which is slightly below the top of the rail, that is, it is spaced a small distance from the top of the rail toward the edge of the rail opposite to the edge adapted to be engaged by the member 16 of the current collector D. The projection of the flange 30 is such that its end lies closely adjacent to the near side of the rail. Should a collector member 16 break, the flange 30 would prevent the broken off piece of the member from dropping between the guard and rail where it might become lodged or wedged with a part thereof extending above the rail in position to interfere with following collectors.

The upper flange part 21 of the guard overlies the top of the rail and the member 16 of the current collectors in engagement with the rail. The free or projecting end of the flange part 21 may be provided with an angular offset portion, such as that shown in the drawings or of some other configuration, for strengthening the same. The guard sections are made of some suitable insulating material such as the material employed for the supporting assemblies E. The adjoining ends of adjacent guard sections are telescoped, that is, the end of one section is provided with an offset portion 35 which overlies the end of the adjoining section so as to eliminate any possibility of a gap or opening between adjoining ends of adjacent guard sections.

As previously mentioned, portions of the guard or guard sections are cut away as indicated at 40 in FIG. 2 to accommodate the supporting assemblies E. When these assemblies occur at the juncture of two guard sections, as illustrated in the drawings, the cut away portion is formed in the adjoining ends of the guard sections. It will be understood, however, that the support assemblies may be located any place along the rail and that the adjoining ends of adjacent guard sections need not occur at rail joints. In other words, the guard sections may be of any convenient length irrespective of the length of the rail sections.

As previously stated and as will be clear from the foregoing description, the rail cover or guard F is supported from the rail A. The engagement between the two members, however, is such that the rail can move or slide lengthwise relative to the guard. This not only facilitates installation of the guard sections but provides for uneven, longitudinal expansion or contraction of the rail relative to the guard. The guard will normally have a very low-coefficient of expansion relative to that of the rail and upon expansion of the rail, an amount greater than the clearance between the support E and the side of the cut away section 40, referring to FIG. 2, the guard will be carried along by the rail until one side of the cut away section 40 engages the support structure E and upon further expansion the rail will slide in the cover or guard.

From the foregoing description of the preferred embodiment of the invention it will be apparent that a new and improved electric power distribution system, particularly of the third-rail type, has been provided and that there has also been provided a novel rail cover or guard for protecting electric conductor rails of the character mentioned from being accidentally contacted by foreign bodies, but which does not interfere with the normal operation of the distribution system and which will prevent a broken fragment of a collector shoe from interfering therewith, including the movement of other current collectors along the conductor rail.

While the preferred embodiment of the invention has been described in considerable detail it is to be understood that the invention is not limited to the particular constructions shown and it is the intention to cover hereby all modifications and adaptations thereof which come within the practice of those skilled in the art to which the invention relates.

Having thus described my invention, what I claim is:

1. In an electric power distributing system for railways and the like, an electric current conductor rail having laterally extending flange means at opposite sides of one edge thereof, members supporting said rail, said members each having a surface adapted to engage said one edge of said rail and hold-down flanges extending around and overlying the edge portions of said flange means for limiting movement of said rail from said surface, guard means slidably connected to and carried by said flange means of said rail and projecting beyond and overlying the opposite edge of said rail, and a current collector supported at the side of said conductor bar opposite said guard means engageable with and movable along said opposite edge of said rail.

2. In an electric power distributing system for railways and the like, an electric current conductor rail having flange means extending laterally along one edge at opposite sides thereof, members slidably supporting said rail, said members each having a surface adapted to engage said one edge of said rail and hold-down flanges extending around and overlying the edge portions of said flange means for limiting movement of said rail from said surface, guard means slidably connected to said flange means of said rail and projecting beyond and overlying the opposite edge of said rail, said guard means having an abutment surface adjacent to said rail and spaced a short distance from said other edge towards said one edge, and a current collector supported at the side of said conductor bar opposite said guard means engageable with and movable along said other edge of said rail, said current collector extending beyond said rail towards said guard means and having a portion thereof overlying said abutment surface.

3. In an electric power distributing system for railways and the like, having an electric current conductor rail including flange means extending laterally from one edge along opposite sides thereof, members slidably supporting the rail having a surface adapted to engage said one edge of the rail and hold-down flanges projecting around the edge portion of said flange means for limiting movement of said conductor bar, and a current collector supported at one side of the rail engageable with and movable along the edge of said rail opposite to said one edge, guard means for protecting the rail adapted to be connected to the flange means of the rail and project beyond and overlie the said opposite edge of the rail, said guard means having an abutment surface adapted for positioning adjacent to the rail and spaced from the said opposite edge of the rail towards the said one edge.

References Cited

UNITED STATES PATENTS

| | | | |
|---|---|---|---|
| 802,716 | 10/1905 | Steinberger | 191—30 |
| 1,532,836 | 4/1925 | Schmid | 191—30 |

ARTHUR L. LA POINT, Primary Examiner

DANIEL F. WORTH III, Assistant Examiner

U.S. Cl. X.R.

191—44.1